(12) United States Patent
Mo et al.

(10) Patent No.: US 12,554,014 B2
(45) Date of Patent: Feb. 17, 2026

(54) DETERMINING RESTROOM OCCUPANCY

(71) Applicant: Sloan Valve Company, Franklin Park, IL (US)

(72) Inventors: Xiaoxiong Mo, Lexington, MA (US); Sheng Deng, Lexington, MA (US); Charles Mo, Lexington, MA (US)

(73) Assignee: Sloan Valve Company, Franklin Park, IL (US)

( * ) Notice: Subject to any disclaimer, the term of this patent is extended or adjusted under 35 U.S.C. 154(b) by 201 days.

(21) Appl. No.: 17/858,620

(22) Filed: Jul. 6, 2022

(65) Prior Publication Data

US 2023/0008566 A1    Jan. 12, 2023

Related U.S. Application Data

(60) Provisional application No. 63/218,542, filed on Jul. 6, 2021.

(51) Int. Cl.
| | | |
|---|---|---|
| *G06Q 10/20* | (2023.01) | |
| *G01S 7/481* | (2006.01) | |
| *G01S 7/4915* | (2020.01) | |
| *G01S 7/51* | (2006.01) | |
| *G01S 17/04* | (2020.01) | |

(Continued)

(52) U.S. Cl.
CPC ............ *G01S 17/04* (2020.01); *G01S 7/4815* (2013.01); *G01S 7/4915* (2013.01); *G01S 7/51* (2013.01); *G06F 3/14* (2013.01); *G06Q 10/20* (2013.01); *G08B 5/22* (2013.01); *G08B 21/22* (2013.01)

(58) Field of Classification Search
CPC ......... G60Q 10/20; G08B 21/22; G06Q 10/20
See application file for complete search history.

(56) References Cited

U.S. PATENT DOCUMENTS

| | | | |
|---|---|---|---|
| 1,976,587 | A | 10/1934 | Teetor |
| 2,565,669 | A | 8/1951 | Smith |

(Continued)

FOREIGN PATENT DOCUMENTS

| | | |
|---|---|---|
| CA | 2010101 A1 | 8/1991 |
| CA | 2354113 A1 | 2/2002 |

(Continued)

OTHER PUBLICATIONS

Jun. 28, 2022, Washroom Occupancy Monitoring System Benotzt LoRa PIR Sensoren.

(Continued)

*Primary Examiner* — Andrew Chase Lakhani
(74) *Attorney, Agent, or Firm* — Banner & Witcoff, Ltd.

(57) ABSTRACT

Techniques for determining bathroom occupancy are disclosed herein. In this regard, one or more sensors may determine whether a plumbing fixture is in use. When a plumbing fixture is in use, the one or more sensors may trigger a visual cue that indicates that the plumbing fixture is in use. Additionally, the one or more sensors may send (e.g., transmit) information indicating that the plumbing fixture is in use to one or more computing devices. The information may include a start time of the fixture's usage, an end time of the fixture's usage, a duration of the fixture's usage, etc. The computing device may analyze the information from a plurality of fixtures associated with a location and present the analysis to a user, for example, via a dashboard.

21 Claims, 8 Drawing Sheets

(51) Int. Cl.
  *G06F 3/14*      (2006.01)
  *G08B 5/22*      (2006.01)
  *G08B 21/22*     (2006.01)

(56) References Cited

U.S. PATENT DOCUMENTS

| | | |
|---|---|---|
| 4,643,375 A | 2/1987 | Allen |
| 5,781,108 A | 7/1998 | Jacob et al. |
| 5,861,806 A | 1/1999 | Vories et al. |
| 5,945,914 A | 8/1999 | Holmes et al. |
| 6,067,673 A | 5/2000 | Paese et al. |
| 6,359,564 B1 | 3/2002 | Thacker |
| 6,549,816 B2 | 4/2003 | Gauthier et al. |
| 6,731,200 B2 | 5/2004 | Wagner et al. |
| 6,967,587 B2 | 11/2005 | Snell et al. |
| 7,068,179 B2 | 6/2006 | Snell et al. |
| 7,248,163 B2 | 7/2007 | Wu |
| 7,304,569 B2 | 12/2007 | Marcichow |
| 7,316,086 B2 | 1/2008 | Schuling et al. |
| 7,571,694 B2 | 8/2009 | Boerner |
| 8,141,296 B2 | 3/2012 | Bem |
| 8,364,546 B2 | 1/2013 | Yenni et al. |
| 8,587,446 B2 | 11/2013 | Hefferon |
| 8,698,333 B2 | 4/2014 | Glasser et al. |
| 8,970,391 B2 | 3/2015 | Hoekstra |
| 9,299,270 B2 | 3/2016 | Hosilyk |
| 9,497,832 B2 | 11/2016 | Verberkt et al. |
| 9,574,374 B2 | 2/2017 | Klevens et al. |
| 9,965,938 B1 | 5/2018 | Cronin et al. |
| 10,066,379 B2 | 9/2018 | Schomburg et al. |
| 10,081,968 B2 | 9/2018 | Klevens et al. |
| 10,292,544 B1 | 5/2019 | Bonner et al. |
| 10,430,737 B2 | 10/2019 | Yenni et al. |
| 10,494,836 B2 | 12/2019 | Voelker |
| 10,822,784 B2 | 11/2020 | Schomburg et al. |
| 10,906,647 B2 | 2/2021 | Alvarez |
| 10,920,466 B2 | 2/2021 | Long et al. |
| 10,943,420 B1 | 3/2021 | Heller et al. |
| 11,047,119 B2 | 6/2021 | Gallob |
| 11,085,658 B1 | 8/2021 | Weems |
| 11,153,945 B1 * | 10/2021 | Feil .................. H05B 45/20 |
| 11,240,649 B2 | 2/2022 | Heller |
| 11,282,411 B2 | 3/2022 | Roark |
| 11,336,728 B2 | 5/2022 | Heller |
| 11,367,041 B2 | 6/2022 | Munir et al. |
| 11,473,284 B2 | 10/2022 | Schomburg et al. |
| 11,488,457 B2 | 11/2022 | Chakraborty et al. |
| 2003/0210140 A1 | 11/2003 | Menard et al. |
| 2006/0226660 A1 | 10/2006 | Wu |
| 2010/0186162 A1 | 7/2010 | Leonard |
| 2011/0016938 A1 | 1/2011 | Chi |
| 2011/0167884 A1 | 7/2011 | Dumortier et al. |
| 2012/0154169 A1 * | 6/2012 | Hoekstra .................. G07F 9/009 |
| | | 340/870.01 |
| 2012/0180208 A1 | 7/2012 | White |
| 2014/0111329 A1 | 4/2014 | Tearston |
| 2015/0088570 A1 * | 3/2015 | Yenni ..................... G06Q 10/06 |
| | | 705/7.15 |
| 2016/0202678 A1 * | 7/2016 | Aggarwal ................ H04N 5/33 |
| | | 700/275 |
| 2018/0299845 A1 * | 10/2018 | Ray ........................ G05B 15/02 |
| 2019/0045027 A1 | 2/2019 | Wei |
| 2019/0146438 A1 * | 5/2019 | Rexach .................. H04R 5/027 |
| | | 700/275 |
| 2019/0213438 A1 * | 7/2019 | Jones ..................... G06V 40/10 |
| 2019/0368226 A1 | 12/2019 | Sweeney et al. |
| 2019/0392377 A1 | 12/2019 | Munir et al. |
| 2020/0082551 A1 * | 3/2020 | Steiner ................ H05B 47/115 |
| 2020/0190856 A1 | 6/2020 | Kaverina |
| 2020/0217057 A1 * | 7/2020 | Spiro ..................... A47L 9/0063 |
| 2020/0226890 A1 | 7/2020 | Ellefred et al. |
| 2020/0250774 A1 * | 8/2020 | Agarwal .......... G06Q 10/06315 |
| 2021/0027402 A1 * | 1/2021 | Davis .................... G06Q 50/163 |
| 2021/0058463 A1 | 2/2021 | Heller |
| 2021/0176319 A1 | 6/2021 | Leannah et al. |
| 2021/0280043 A1 | 9/2021 | Williams, Jr. et al. |
| 2021/0350689 A1 * | 11/2021 | Kelly .................. G08B 21/245 |
| 2021/0383658 A1 | 12/2021 | Chakraborty et al. |
| 2022/0018103 A1 | 1/2022 | Gallob |
| 2022/0191984 A1 | 6/2022 | Feil et al. |
| 2022/0247794 A1 | 8/2022 | Chakraborty et al. |
| 2022/0338686 A1 * | 10/2022 | Jolin ..................... G06F 3/0304 |
| 2022/0360869 A1 | 11/2022 | Amin et al. |
| 2022/0373982 A1 | 11/2022 | Chakraborty et al. |
| 2023/0008566 A1 | 1/2023 | Mo et al. |

FOREIGN PATENT DOCUMENTS

| | | |
|---|---|---|
| CA | 2627110 A1 | 10/2009 |
| CA | 2664815 A1 | 11/2010 |
| CA | 2929765 A1 | 11/2017 |
| CN | 87214957 U | 11/1988 |
| CN | 201062744 Y | 5/2008 |
| CN | 101672114 A | 3/2010 |
| CN | 202455586 U | 9/2012 |
| CN | 202559874 U | 11/2012 |
| CN | 202583490 U | 12/2012 |
| CN | 203535706 U | 4/2014 |
| CN | 104698886 A | 6/2015 |
| CN | 205594824 U | 9/2016 |
| CN | 206042471 U | 3/2017 |
| CN | 107219789 A | 9/2017 |
| CN | 206557926 U | 10/2017 |
| CN | 207150907 U | 3/2018 |
| CN | 109903697 A | 6/2019 |
| CN | 209343713 U | 9/2019 |
| CN | 209690507 U | 11/2019 |
| CN | 210402599 U | 4/2020 |
| CN | 111200894 A | 5/2020 |
| CN | 210603375 U | 5/2020 |
| CN | 111262905 A | 6/2020 |
| CN | 211115002 U | 7/2020 |
| CN | 111809968 A | 10/2020 |
| CN | 111866151 A | 10/2020 |
| CN | 213025157 U | 4/2021 |
| CN | 213025158 U | 4/2021 |
| DE | 19507140 A1 | 9/1996 |
| DE | 202014100796 U1 | 6/2014 |
| DE | 102015015653 A1 | 6/2017 |
| DE | 202020100038 U1 | 3/2020 |
| EP | 1255008 A2 | 11/2002 |
| EP | 2834713 A1 | 2/2015 |
| EP | 3388601 A1 | 10/2018 |
| EP | 3388604 A1 | 10/2018 |
| FR | 2661971 A1 | 11/1991 |
| FR | 3025235 A1 | 3/2016 |
| GB | 190226534 A | 10/1903 |
| GB | 2517965 A | 3/2015 |
| GB | 2535649 A | 8/2016 |
| GB | 2562872 A | 11/2018 |
| IL | 77401 A | 5/1993 |
| JP | S55-121235 A | 9/1980 |
| JP | 3024707 B2 | 3/2000 |
| JP | 3036261 B2 | 4/2000 |
| JP | 3067955 B2 | 7/2000 |
| JP | 3197976 B2 | 8/2001 |
| JP | 2001283347 A | 10/2001 |
| JP | 3267426 B2 | 3/2002 |
| JP | 2002312815 A | 10/2002 |
| JP | 2005025625 A | 1/2005 |
| JP | 2005305123 A | 11/2005 |
| JP | 2010007388 A | 1/2010 |
| JP | 2011100441 A | 5/2011 |
| JP | 2011125593 A | 6/2011 |
| JP | 2011170827 A | 9/2011 |
| JP | 2019208547 A | 12/2019 |
| JP | 2021074078 A | 5/2021 |
| JP | 1688363 S | 6/2021 |
| KR | 20010045213 A | 6/2001 |
| KR | 200243837 Y1 | 10/2001 |
| KR | 20020092578 A | 12/2002 |
| KR | 100454762 B1 | 11/2004 |
| KR | 200378878 Y1 | 3/2005 |
| KR | 20090098358 A | 9/2009 |

(56) References Cited

FOREIGN PATENT DOCUMENTS

| KR | 20130012638 A     | 2/2013  |          |
|----|-------------------|---------|----------|
| KR | 20140060895 A     | 5/2014  |          |
| KR | 101439238 B1      | 9/2014  |          |
| KR | 101507870 B1      | 4/2015  |          |
| KR | 20160013774 A     | 2/2016  |          |
| KR | 101868508 B1      | 6/2018  |          |
| KR | 102056317 B1      | 12/2019 |          |
| WO | 2020071998 A1     | 4/2020  |          |
| WO | WO-2021050963 A1 *| 3/2021  | .............. H04W 4/38 |
| WO | 2022165062 A1     | 8/2022  |          |
| WO | 2022252829 A1     | 12/2022 |          |

OTHER PUBLICATIONS

Use People Counting Technology to Improve Restroom Facilities.
How connected is your Restroom? Toto's IoT-enabled products make the workplace and public spaces smarter and safer.
Jul. 14, 2020, Bathroom Occupancy Counter.
Smart Washroom Solution.
Mar. 22, 2017, This bathroom in South Korea shows which stalls are occupied, by Ashley Carman.
LoRaWan Sensing Technology Turns Smart Toilet into More Comfort and Better Experience.
People Counting Systems for Toilets.
FootfallCam Smart Washroom Solution.
Apr. 5-7, 2022, IoT Based Cubicle Occupancy Indicator for Public Toilets, Proceedings of the International Conference on Industrial Engineering and Operations Management Nsukka, Nigeria.
The Washroom Occupancy Indicator & Sensor System.

\* cited by examiner

DETERMINING RESTROOM OCCUPANCY

CROSS-REFERENCE TO RELATED APPLICATIONS

This application is a non-provisional of, and claims priority to, U.S. Provisional Application No. 63/218,542, filed on Jul. 6, 2021 and entitled "Determining Restroom Occupancy," the entirety of which is incorporated herein in its entirety for all purposes.

FIELD OF THE DISCLOSURE

Aspects of the disclosure generally relate to determining bathroom occupancy using one or more sensors and logic.

BACKGROUND OF THE DISCLOSURE

At present, systems to detect and measure bathroom usage through occupancy levels are unreliable. Accordingly, bathrooms may be cleaned and/or maintained during peak usage, resulting in an inconvenience to both users and maintenance crews. Thus, there is a need to more accurately ascertain bathroom usage through occupancy levels.

BRIEF SUMMARY OF THE DISCLOSURE

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, methods, and computer-readable media are also within the scope of the disclosure.

The present disclosure describes a system for determining bathroom occupancy. The system may comprise one or more sensors, such as infrared sensors, time-of-flight sensors, or any combination thereof. The system may include one or more centrally located sensors, or sensor arrays. Additionally, the system may comprise one or more sensors disposed above bathroom fixtures. In particular, the one or more sensors may be disposed in, or on, the ceiling of doorways, such as in the ceiling of an entry/exit to a water closet or on the ceiling above a sink or hand drying station. In some examples, the one or more sensors may be disposed in (e.g., a part of) the bathroom fixtures themselves. The one or more sensors may determine whether a fixture is in use (e.g., occupied) or not in use (e.g., available for use). The one or more sensors may provide an indication (e.g., visual indication) of whether the fixture is in use or not in use (e.g., available for use). Additionally or alternatively, the one or more sensors may provide information to a computing device, or the centrally located sensor, indicating that the fixture is in use. The computing device may analyze information from a plurality of fixtures associated with a location. Based on the analysis, the computing device may be able to determine peak usage times, average usage length, hygiene practices of average users, etc. The analysis may provide recommendations regarding maintenance and/or cleaning of the bathroom itself. Further, the analysis may provide recommendations regarding the maintenance, servicing, and/or repair of the plurality of fixtures based on their use.

The features, along with many others, and benefits are discussed in greater detail below.

BRIEF DESCRIPTION OF THE DRAWINGS

The present disclosure is described by way of example and not limited in the accompanying figures in which.

DETAILED DESCRIPTION OF THE DISCLOSURE

Figure 1A:
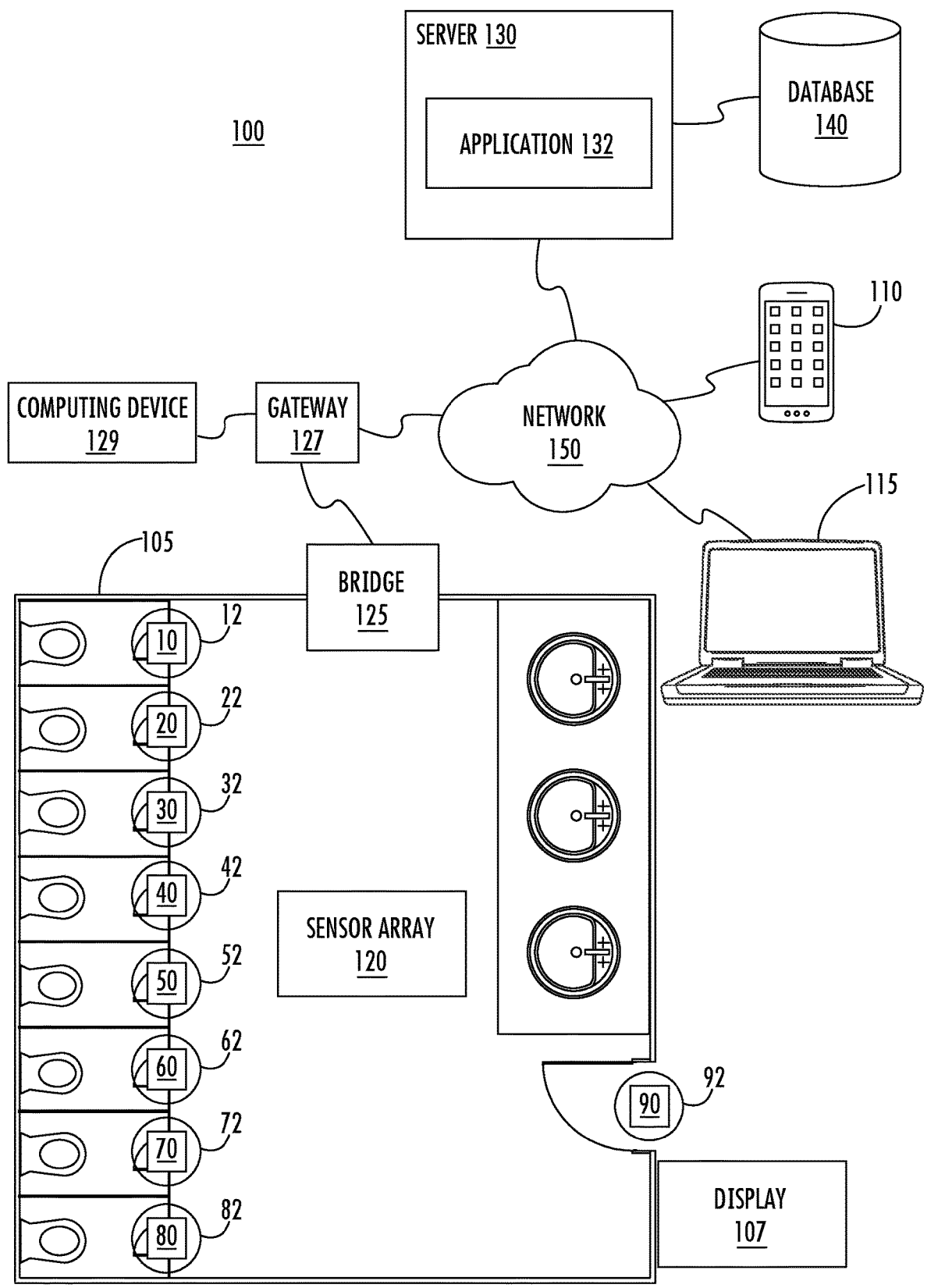
FIGS. 1A-1B show an example of a water closet containing a plumbing fixture that includes a sanitation unit.

In the following description of the various example embodiments, reference is made to the accompanying drawings, which form a part hereof, and in which is shown by way of illustration various example embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

The present disclosure provides a restroom occupancy system that uses one or more sensors to determine an occupancy of a restroom. The restroom occupancy system described herein may comprise one or more sensor arrays and one or more sensors. The sensor array may be centrally located in a restroom, whereas the one or more sensors may be associated with one or more fixtures. When there are more than one sensor array, the sensory arrays may be evenly located throughout a restroom. At installation, the restroom occupancy system may determine a layout of the restroom. The layout may be determined using the one or more sensor arrays and/or the one or more sensors. Determining the layout of the restroom may include identifying each of the fixtures in the restroom, including water closets, urinals, sinks, soap dispensers, hand drying stations (e.g., blowers, paper towel dispensers, etc.), etc. Determining the layout of the restroom may also include associating each of the one or more sensors with one or more restroom fixtures.

After the layout of the restroom is determined, the restroom occupancy system may use the sensor array and/or the one or more sensors to detect one or more occupants. The sensor array and/or the one or more sensors may detect the one or more occupants as they enter, or exit, the restroom.

The restroom occupancy system may cause an occupancy of the restroom to be displayed. The occupancy may be displayed on a sign outside of the restroom. Additionally or alternatively, the occupancy may be displayed on a computing device, for example, via a dashboard.

Additionally, the sensor array and/or the one or more sensors may detect a location for each of the one or more occupants in the restroom. Moreover, the sensor array and/or the one or more sensors may be configured to determine each of the one or more occupants' intent based on the location. For example, the restroom occupancy system may determine that a first user is using a water closet based on the first user's location. Similarly, the restroom occupancy system may determine that a second user is washing their hands at a sink based on the second user's location. The restroom occupancy system may be configured to activate certain features of the restroom in response to determining a location for each of the occupant. Continuing the example above, the restroom occupancy sensor may change the color of an occupancy indicator of the water closet to indicate that the water closet is occupied by the first user. The restroom occupancy sensor may also cause a toilet to be flushed upon detecting the exiting the water closet. The restroom occupancy sensor may also update the occupancy indicator to show that the water closet is unoccupied. Similarly, the restroom occupancy sensor may activate a faucet in response to detecting the second user's location. The restroom occupancy sensor may also turn off the faucet based on a determination that the second user's location has changed.

By using the restroom occupancy system described herein, peak usage times, average usage length, hygiene practices of average users, etc. may be determined to provide insight into the usage of the restroom. This information may be used to schedule maintenance and/or cleaning of the restroom itself.

Figure 1B:
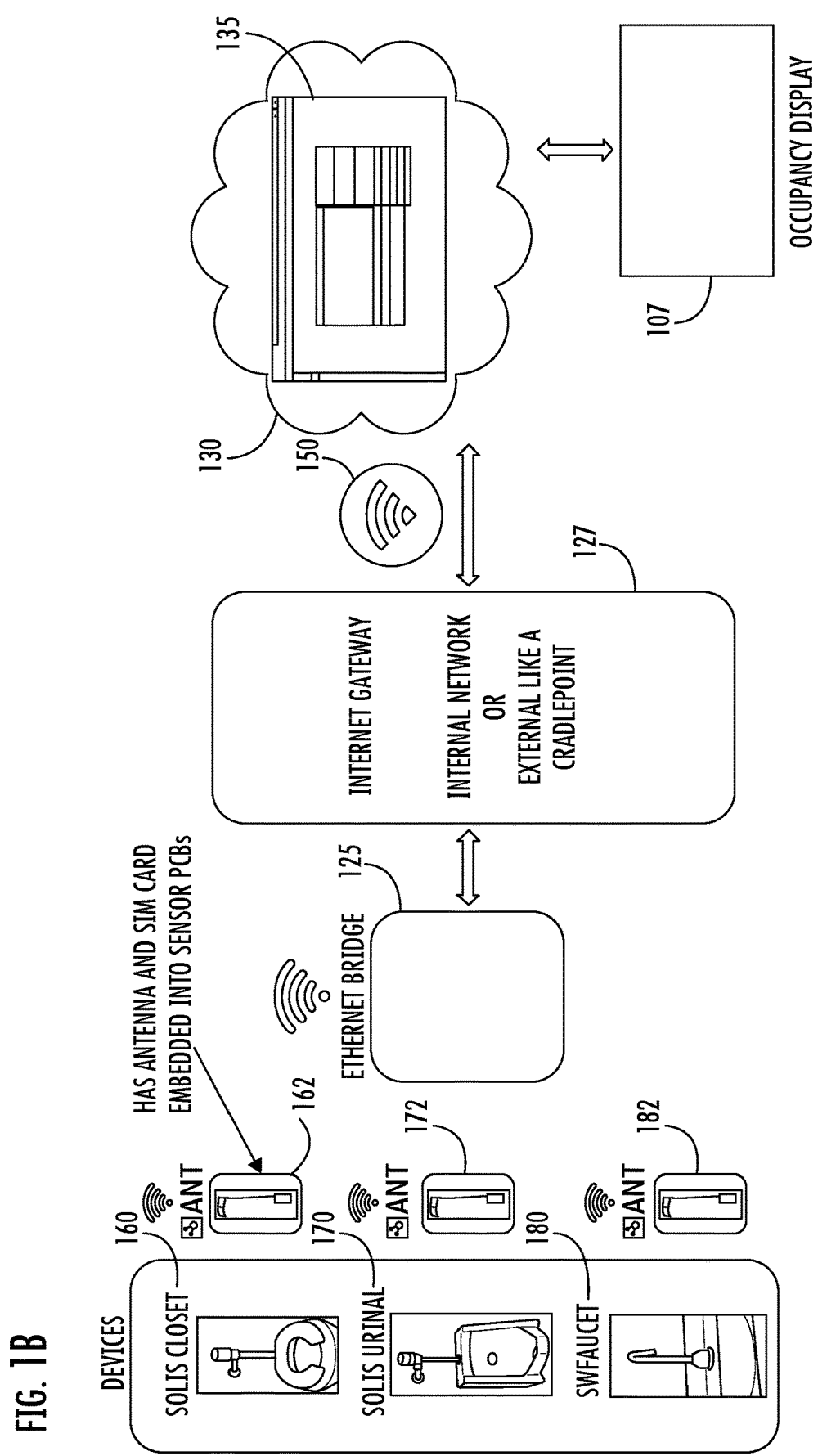

Turning to FIGS. 1A-1B, a restroom occupancy system 100 according to one or more aspects of the disclosure is shown. The restroom occupancy system 100 comprises a restroom 105, a first user device 110, a second user device 115, and a server 130 interconnected via network 150.

Restroom 105 may be a bathroom in a commercial space, such as an office building, a retailer (e.g., mall), a stadium, etc. The restroom 105 may comprise a plurality of water closets and a plurality of sinks. Although not shown in FIGS. 1A-1B, the restroom 105 may also comprise urinals, hand dryers, hand sanitation units, etc. Additionally, the restroom 105 may comprise a plurality of sensors (e.g., 10, 20, 30, 40, 50, 60, 70, 80, 90), each of the plurality of sensors located at a threshold of a doorway. The plurality of sensors (e.g., 10, 20, 30, 40, 50, 60, 70, 80, 90) may be located in a ceiling above a doorway. The ceiling mounted sensors may include a pivot point for the sensor to overcome ceiling obstacles. In some examples, the plurality of sensors (e.g., 10, 20, 30, 40, 50, 60, 70, 80, 90) may be disposed in (e.g., a part of) the bathroom fixtures themselves. Additionally or alternatively, the plurality of sensors (e.g., 10, 20, 30, 40, 50, 60, 70, 80, 90) may be proximately located next to doors and/or fixtures. It will be appreciated that any combination of locations may be used for the plurality of sensors (e.g., 10, 20, 30, 40, 50, 60, 70, 80, 90). The plurality of sensors (e.g., 10, 20, 30, 40, 50, 60, 70, 80, 90) may be hardwired into a building's electrical supply. Alternatively, the plurality of sensors (e.g., 10, 20, 30, 40, 50, 60, 70, 80, 90) may receive power from a low-voltage power supply, such as power-over-ethernet (PoE) or from a transformer located in the restroom 105. Each of the plurality of sensors (e.g., 10, 20, 30, 40, 50, 60, 70, 80, 90) may have a field of view (e.g., 12, 22, 32, 42, 52, 62, 72, 82, 92) associated therewith. As will be discussed in greater detail below, each of the plurality of sensors (e.g., 10, 20, 30, 40, 50, 60, 70, 80, 90) may transmit one or more beams of light. The one or more beams of light may form a coverage area comprising a plurality of pixels, as discussed in greater detail below with respect to FIG. 3. Each of the plurality of sensors (e.g., 10, 20, 30, 40, 50, 60, 70, 80, 90) may be capable of detecting a direction (e.g., entering, exiting) of a user, for example, based on changes in the reflected light associated with each of the plurality of pixels. Upon detecting a user, the plurality of sensors (e.g., 10, 20, 30, 40, 50, 60, 70, 80, 90) may activate a visual cue (e.g., one or more lights) indicating that the fixture associated with the sensor is in use. In this regard, the plurality of sensors (e.g., 10, 20, 30, 40, 50, 60, 70, 80, 90) may comprise one or more indicators (e.g., lights, LEDs, etc.) that indicate when a fixture is in use. For example, a first sensor, of the plurality of sensors, may be emit a green light when a fixture (e.g., water closet) is not in use. When the fixture is in use, the first sensor may emit a red light. Similarly, the first sensor may emit a red light, for example, when a fixture is out-of-service. In some examples, the first sensor may omit an orange or yellow light, for example, when a fixture needs service and/or maintenance. The plurality of sensors (e.g., 10, 20, 30, 40, 50, 60, 70, 80, 90) may determine which light to emit, for example, based on detecting one or more users entering (approaching) or exiting (leaving) a fixture. Additionally or alternatively, plurality of sensors (e.g., 10, 20, 30, 40, 50, 60, 70, 80, 90) and/or sensor array 120 may determine when a device has been activated (e.g., a toilet, or urinal, flushed, a sink turned on/off, a hand dryer activated, a paper towel dispenser activated, etc.). The plurality of sensors (e.g., 10, 20, 30, 40, 50, 60, 70, 80, 90) may send usage information to a computing device, such as a local computing device 129 and/or the server 130. The local computing device 129 may be a computing device, such as a server, a user device, a location smart display monitor, or any combination thereof, located on the same premises as the restroom 105. The usage information may be sent to the local computing device 129 via the bridge 125. Additionally or alternatively, the usage information may be sent via bridge 125 and/or gateway 127 to the server 130. In response to receiving the signals from the bridge 125, the computing device (e.g., the local computing device 129 and/or the server 130) may determine the restroom 105's occupancy level. Additionally or alternatively, the computing device (e.g., the local computing device 129 and/or the server 130) may send a signal to the first sensor, for example, through the bridge 125 and/or the gateway 127. The signal may indicate that the first sensor should change the indication. By transmitting the usage information to the computing device (e.g., the local computing device 129 and/or the server 130), the computing device (e.g., the local computing device 129 and/or the server 130) may be able to ascertain real-time usage data associated with the restroom 105.

In addition to the plurality of sensors (e.g., 10, 20, 30, 40, 50, 60, 70, 80, 90), the restroom 105 may comprise sensor array 120. The sensor array 120 may be centrally located in the restroom 105. While one sensor array 120 is shown in FIG. 1A, it will be appreciated that a plurality of sensor arrays may be used, for example, in larger restrooms. In these cases, the plurality of sensor arrays may coordinate to establish a primary (master) sensor array.

Upon initial activation, sensor array 120 may detect the plurality of sensors (e.g., 10, 20, 30, 40, 50, 60, 70, 80, 90). For example, sensor array 120 may detect and/or communicate with the plurality of sensors (e.g., 10, 20, 30, 40, 50, 60, 70, 80, 90) using any short-range wireless protocol, such as Bluetooth, Zigbee, Z-Wave, ANT, LoRa, or any equivalent thereof. Alternatively, sensor array 120 may communicate with the plurality of sensors (e.g., 10, 20, 30, 40, 50, 60, 70, 80, 90) via a wired communication. In some instances, sensor array 120 may initiate a scan of restroom 105 to identify the plurality of sensors (e.g., 10, 20, 30, 40, 50, 60, 70, 80, 90), in addition to the features and/or fixtures of restroom 105. As will be discussed in greater detail below, sensor array 120 and the plurality of sensors (e.g., 10, 20, 30, 40, 50, 60, 70, 80, 90) may be used to generate a map of restroom 105. The map of restroom may be used to determine an occupancy of restroom 105. That is, after restroom 105 has been mapped, sensor array 120 may be configured to detect a plurality of users. Based on a location of each of the plurality of users relative to the mapping, sensor array 120 may determine an occupancy of restroom 105.

In order to perform the mapping and/or determine the location of each of a plurality of restroom occupants, the sensor array 120 may comprise a linear thermal sensor array or multi-pixel thermal sensor (e.g., 32×32 array). The sensor array 120 may be configured to cover a predetermined area (e.g., 19×19 feet and/or 6 water closets). In addition to covering the water closets, the sensor array 120 may cover urinals, sinks, paper towel dispensers, hand sanitation units, hand dryers, and/or the floor of the restroom 105. While only one sensor array 120 is shown in FIG. 1A, it will be appreciated that the restroom 105 may comprise more sensor arrays similar to those described above. Like the plurality of sensors (e.g., 10, 20, 30, 40, 50, 60, 70, 80, 90), the sensor array 120 may send bathroom occupancy information (e.g., bathroom occupancy estimation) to a computing device, such as the local computing device 129, the server 130, and/or a smart display monitor. The bathroom occupancy information may be sent via bridge 125 and/or gateway 127. The computing device (e.g., the local computing device 129 and/or the server 130) may send a signal to the restroom 105, for example—through the bridge 125 and/or the gateway 127, indicating an occupancy level associated with the restroom 105. The restroom 105 may display the occupancy information, for example, via a display 107.

Display 107 may comprise a liquid crystal display (LCD) display technology, a light emitting diode (LED) display technology, vacuum florescent display technology, and/or the like. The display 107 may be configured to display occupancy information associated with the restroom 105. The occupancy information may be provided from the local computing device 129. Additionally or alternatively, the occupancy information may be provided by the server 130 via the gateway 127 and/or the bridge 125.

Bridge 125 may be configured to connect one or more fixtures, one or more of the plurality of sensors (e.g., 10, 20, 30, 40, 50, 60, 70, 80, 90), and/or the sensor array 120 with a network. The network may be a local area network, such as a building or corporate network. The bridge 125 may be a wired or wireless bridge. In preferred embodiments, the bridge 125 comprises a wireless interface to communicate (e.g., send/receive) with one or more fixtures, one or more of the plurality of sensors (e.g., 10, 20, 30, 40, 50, 60, 70, 80, 90), and/or the sensor array 120. The wireless interface may use a short-range wireless communication protocol, such as Bluetooth® communications, Bluetooth® Low Energy communications, Wi-Fi communications, ANT communications, LoRa communications, Zig Bee Communications, or any equivalent thereof.

Gateway 127 may be configured to connect the network (e.g., building or corporate network) to a wide area network, such as network 150. The gateway 127 may provide interoperability between building or corporate network and network 150. The gateway 127 may comprise protocol translators, impedance matchers, rate converters, fault isolators, or signal translators. In some examples, the gateway 127 may perform protocol conversions to connect networks with different network protocol technologies.

First user device 110 may be a mobile device, such as a cellular phone, a mobile phone, a smart phone, a tablet, a laptop, or an equivalent thereof. First user device 110 may provide a first user with access to various applications and services. For example, first user device 110 may provide the first user with access to the Internet. Additionally, first user device 110 may provide the first user with one or more applications ("apps") located thereon. The one or more applications may provide the first user with a plurality of tools and access to a variety of services. In some embodiments, the one or more applications may include an application that provides access to a dashboard, or portal, that provides information about restroom occupancy and/or plumbing fixtures. As noted herein, the information may include usage and/or statistics about a restroom's usage. The information may also comprise critical diagnostics. Additionally or alternatively, the information may include information about individual fixtures, including, for example, real-time information about whether a fixture is currently being used. The application may comprise an authentication process to verify (e.g., authenticate) the identity of the first user prior to granting access to the dashboard (e.g. portal) 135.

Second user device 115 may be a device configured to allow a user to execute software for a variety of purposes. Second user device 115 may belong to the first user that accesses first user device 110, or, alternatively, second user device 115 may belong to a second user, different from the first user. Second user device 115 may be a desktop computer, laptop computer, or, alternatively, a virtual computer. The software of second user device 115 may include one or more web browsers that provide access to websites on the Internet. These websites may include plumbing websites that allow the user to view information about a building's plumbing, an individual bathroom, and/or an individual fixture. In some embodiments, second user device 115 may include an application that allows the user to access a dashboard 135, or portal, to view information about a building's plumbing, an individual bathroom, and/or an individual fixture. As noted above, the information may comprise critical diagnostics about the plumbing fixtures. The website and/or the application may comprise an authentication component to verify (e.g., authenticate) the identity of the second user prior to granting access to the dashboard 135 (e.g., portal).

Server 130 may be any server capable of executing application 132. Additionally, server 130 may be communicatively coupled to a database 140. In this regard, server 130 may be a stand-alone server, a corporate server, or a server located in a server farm or cloud-computer environment. According to some examples, server 130 may be a virtual server hosted on hardware capable of supporting a plurality of virtual servers. In some instances, the server 130 may be hosted by a commercial plumbing supply company, such as Sloan Valve Company. The server 130 may be hosted in a cloud provider, such as Microsoft Azure Cloud Service or an equivalent thereof. The server may execute application 132 on behalf of one or more consumers of the products manufactured and distributed by the commercial plumbing supply company.

The application 132 may be server-based software configured to provide users with information about restroom 105. In some embodiments, the application 132 may be server-based software that corresponds to client-based software executing on first user device 110 and/or second user device 115. Additionally, or alternatively, the application 132 may provide users access to the information through a website, or portal, accessed by first user device 110 or second user device 115 via network 150. The application 132 may comprise an authentication module to verify users before granting access to the information. The information may include a start time of the fixture's usage, an end time of the fixture's usage, a duration of the fixture's usage, etc. The application 132 may also analyze the information from a plurality of fixtures associated with a location and present the analysis to a user, for example, via the dashboard 135. That is, the application 132 may receive information from each of a plurality of fixtures located in a restroom (e.g., restroom 105). The application 132 may then analyze the information associated with the restroom and present the analysis to a user, via the dashboard 135. The application 132 may provide the analysis with respect to individual restrooms. Additionally or alternatively, the application may provide the analysis for a building, as-a-whole, showing usage and/or statistics for all of the restrooms located in a building. It will be appreciated that the dashboard 135 may allow a user to view usage and/or statistics about the building as-a-whole, while allowing the user to also focus on individual restrooms and/or fixtures. In this regard, the dashboard 135 may provide an overall view of the plumbing of a building, as well as granular data and/or information for individual fixtures. The application 132 may also provide real-time information regarding whether a fixture is currently in use. Further, the dashboard 135 may generate notifications, for example, if a restroom and/or fixture requires attention. The notifications may be an electronic communication, such as an email, a text message, a push notification, etc. Additionally or alternatively, the notifications may be displayed via an alert in the dashboard 135 or location smart display monitor.

The database 140 may be configured to store information on behalf of application 132. The information may include, but is not limited to, data about restrooms, such as the quantity, type, model numbers, etc. of the fixtures associated with a restroom. Additionally or alternatively, the information stored in database 140 may comprise usage and/or statistics of each fixture. User-preferences may also be stored in the database 140. The user-preferences may define how users receive notifications, alerts, etc. The database 140 may include, but is not limited to relational databases, hierarchical databases, distributed databases, in-memory databases, flat file databases, XML databases, NoSQL databases, graph databases, and/or a combination thereof.

Network 150 may include any type of network. In this regard, first network 150 may include the Internet, a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. The data transferred to and from various computing devices in system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in system 100 in front of one or more computing devices such that any external devices may communicate directly with the specialized hardware.

FIG. 1B shows an additional perspective of restroom occupancy system 100. As shown in FIG. 1B, the plurality of sensors may be located in plumbing fixtures and/or plumbing hardware. In this regard, a first sensor 160 may be located in a water closet (e.g., Solis Closet), a second sensor 170 may be located in a urinal (e.g., Solis Urinal), and a third sensor 180 may be located in a faucet (e.g., SW Faucet). It will be appreciated that the sensors may be located in a plurality of additional fixtures and/or hardware, including, but not limited to, hand dryers, hand sanitation units, soap dispensers, paper towel dispensers, and/or flood sensors in the floor of a bathroom. Each of the sensors may comprise a short-range wireless transceiver (e.g., antenna). The short-range wireless transceiver may comprise a SIM card, a micro-SIM card, or an equivalent thereof, embedded in each of the sensors. As shown in FIG. 1B, the first sensor 160 comprises a first transceiver 162, the second sensor 170 comprises a second transceiver 172, and the third sensor 180 comprises a third transceiver 182. The short-range wireless transceivers depicted in FIG. 1B may provide one or more of: near field communication (NFC) communications, Bluetooth® communications, Bluetooth® Low Energy communications, Wi-Fi communications, ANT communications, LoRa communications, Zig Bee Communications, or an equivalent thereof.

Figure 2:
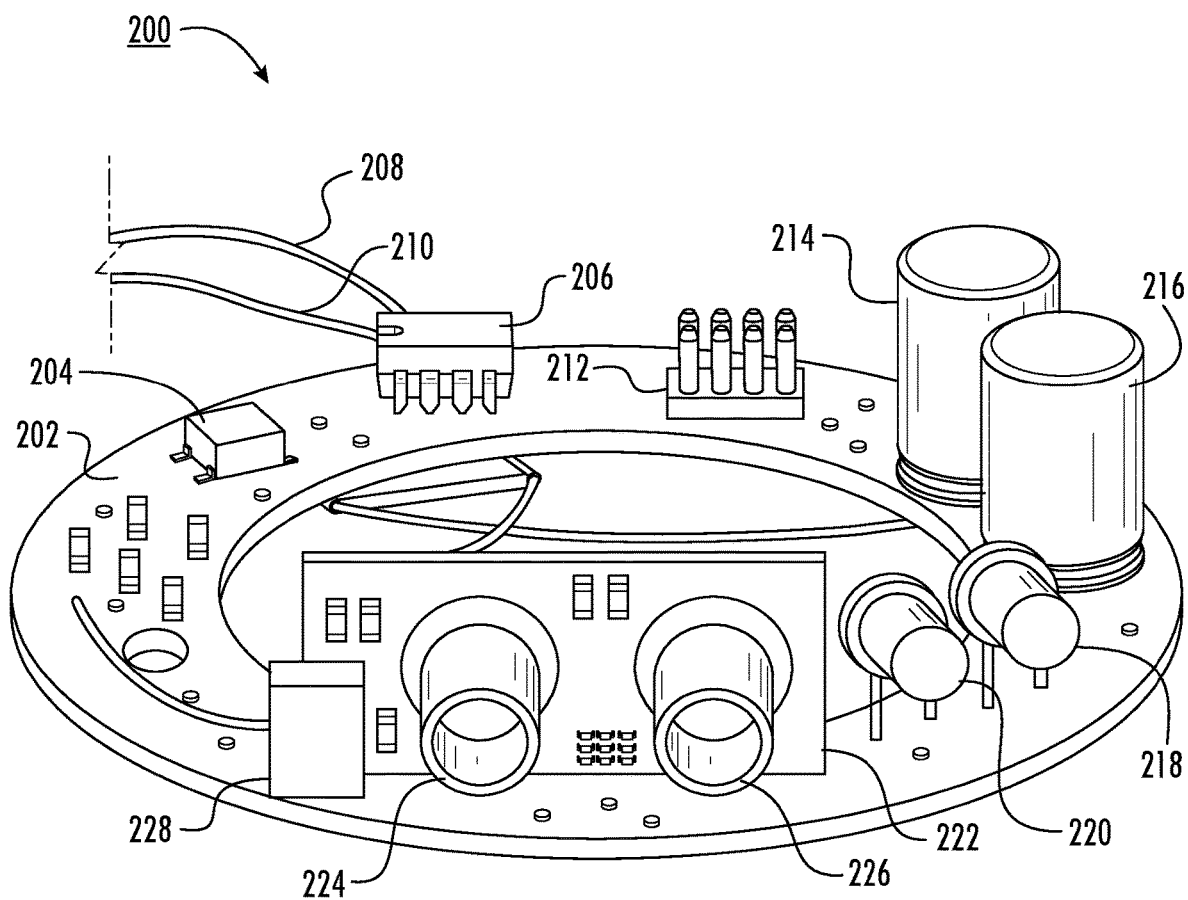
FIG. 2 shows an example of an implementation of the time-of-flight sensor circuit in accordance with one or more aspects of the disclosure.

As noted above, the restroom may comprise one or more sensors configured to be deployed throughout a restroom to provide additional information. FIG. 2 shows an example of a hybrid sensor 200 that may be used as one of the one or more sensors shown in FIGS. 1A and 1B. The hybrid sensor 200 may comprise circuit board 202 that includes processor 204, memory 206, connection module 212, a first capacitor 214, a second capacitor 216, a ToF sensor 222, and an IR sensor comprising a first IR transmitter 218, a second IR transmitter 220, and an IR receiver 228. A data bus (not shown) may interconnect processor 204, memory 206, a ToF controller (not shown), and/or an IR proximity sensor controller (not shown). Additionally, a first electrical lead 208 and a second electrical lead 210 may connect circuit board 202 to a power supply (not shown). The power supply may be configured to supply power to hybrid sensor 200 and/or any additional components, such as a flushing mechanism, a soap dispenser, a faucet, etc. In some instances, the power supply may be a standard alternating current (AC) connection (e.g., 120V/60 Hz). Alternatively, the power supply may be a low voltage power supply (e.g., 6 volts provided by 4 AA alkaline batteries, a lithium-ion battery, etc.) configured to power hybrid sensor 200 and/or any additional components.

Processor 204 may be any suitable processor configured to control operation of the hybrid sensor 200 and its associated components, including memory 206, the first IR transmitter 218, the second IR transmitter 220, the ToF sensor 222, and/or the IR receiver 228. Processor 204 may include a single central processing unit (CPU), which may be a single-core or multi-core processor, or may include multiple CPUs. Additionally or alternatively, processor 204 may include a low-power processor and/or microcontroller, such as an Advanced RISC Machine (ARM) processor and/or any suitable field programmable array (FPGA) or application specific integrated circuit (ASIC). Processor 204 and/or the associated components described herein may allow the hybrid sensor 200 to execute a series of computer-readable instructions to perform some or all of the processes described herein. In some examples processor 204 may comprise an internal memory. The memory may be cache, random access memory (RAM), read only memory (ROM), electronically erasable programmable read only memory (EEPROM), flash memory, or other memory technology. The memory may be configured to store the series of computer-readable instructions that allow processor 204 to perform some or all of the processes described herein.

Memory 206 may include, but is not limited to, random access memory (RAM), read only memory (ROM), electronically erasable programmable read only memory (EEPROM), flash memory, or other memory technology, optical disk storage, magnetic cassettes, magnetic tape, magnetic disk storage or other magnetic storage devices, or any other medium that may be used to store the desired information and that may be accessed by processor 204. Software may be stored within memory 206 to provide instructions to processor 204 allowing hybrid sensor 200 to perform various actions. The various hardware memory units in memory 204 may include volatile and nonvolatile, removable and non-removable media implemented in any method or technology for storage of information such as computer-readable instructions, data structures, program modules, or other data.

Connection module 212 may be any connection interface configured to communicate with one or more control modules. For example, connection module 212 may include a plurality of pins (e.g., 4, 6, 8, 12, etc.) configured to receive a female connector from one or more control modules. In this regard, processor 204 may communicate with the one or more control modules via connection module 212. For instance, the processor 204 may send a first signal and/or power via connection module 212 to a flush control module. The flush control module may receive the first signal and provide a signal to a solenoid, which may cause a plunger to move to effectuate flushing of a toilet (or urinal). Similar operations may occur to turn on a faucet, turn off a faucet, dispense soap, activate a hand dryer, dispense paper towels, open an automatic door, etc. In another example the processor 204 may send a second signal and/or power via connection module 212 to an ultraviolet sanitation unit (e.g., ultraviolet lights). The ultraviolet sanitation unit activate one or more ultraviolet lights. The one or more ultraviolet lights may be activated for a predetermined amount of time, for example, to disinfect, clean, sterilize, and/or sanitize a plumbing fixture.

First capacitor 214 and second capacitor 216 may be capacitors of any suitable size. First capacitor 214 and second capacitor 216 may be bi-stable solenoid driver storage components. In this regard, first capacitor 214 and/or second capacitor 216 may be configured to operate a solenoid. For instance, first capacitor 214 may be configured to latch the bi-stable solenoid and second capacitor 216 may be configured to unlatch the bi-stable solenoid. Additionally or alternatively, the second capacitor 216 may be configured to regulate the voltage to the first IR transmitter 218, the second IR transmitter 220, and/or the time-of-flight sensor 222.

First IR transmitter 218 and second IR transmitter 220 may be part of a proximity sensor, such as an infrared sensor. For example, first IR transmitter 218 and/or second IR transmitter 220 may be part of a Sloan® G2 proximity sensor. In some instances, first IR transmitter 218 and/or second IR transmitter 220 may be a low powered IR diode configured to emit (e.g., transmit, irradiate) IR light at a steady (e.g., constant, continuous) rate. In some examples, first IR transmitter 218 may be angled upwards, while second IR transmitter 220 may be angled downward or upward. The first IR transmitter 218 may be angled upward between 15 and 30 degrees, and second IR transmitter 220 may be angled downward, or upward, at a similar angle (e.g., between 10 and 30 degrees). By angling the first IR transmitter 218 and the second IR transmitter 220 in different directions, the hybrid sensor may better detect the presence and/or location of a user proximate to hybrid sensor 200 and its relative position with respect to other non-moving (e.g., steady-state) components within range of hybrid sensor 200. IR receiver 228 may be another component of the proximity sensor (e.g., the IR sensor). In this regard, IR receiver 228 may be a photoreceptor configured to detect IR light transmitted by the first IR transmitter 218 and/or the second IR transmitter 220. The IR receiver 228 may detect an object proximately located to hybrid sensor 200, for example, if a certain amount and/or intensity of IR light was detected. That is, if the detected light was equal to or greater than a predetermined threshold (e.g., a predetermined number of lumens), the IR receiver 228 (e.g., photoreceptor) may indicate an object proximate to hybrid sensor 200. Additionally or alternatively, several thresholds may be used to determine how close the object is to the hybrid sensor 200. Indicating an object proximate to hybrid sensor 200 may comprise sending (e.g., transmitting) a signal to processor 204 indicating the presence of the object. The first IR transmitter 218, the second IR transmitter 220, and the IR receiver 228 may be collectively referred to as an IR sensor.

ToF sensor 222 may comprise a ToF transmitter 224 and a ToF receiver 226. The ToF transmitter 224 may be a diode configured to emit (e.g. transmit, send) a laser beam at one or more objects. The ToF transmitter 224 may be a Vertical Cavity Surface-Emitting Laser (VCSEL) configured to transmit a laser at a predetermined wavelength (e.g., 940 nm). The ToF receiver 226 may be a photoreceptor configured to receive the laser beam reflected off of the one or more objects. The ToF sensor 222 may be configured to determine how far the one or more objects are from hybrid sensor 200 using the roundtrip time from when the laser was transmitted by the ToF transmitter 224 until the reflected laser was received by the ToF receiver 226. In some examples, the ToF sensor 222 may use a SPAD (Single Photon Avalanche Diodes) array to measure distances up to several (e.g., ≥2) meters away in a short period of time (e.g., <30 ms).

The hybrid sensor 200 may comprise one or more detection zones. That is, the hybrid sensor 200 may also determine how far (e.g., an IR distance) an object is from the sensor in addition to detecting the presence of the object. For example, the hybrid sensor 200 may comprise a first detection zone, a second detection zone, and/or a third detection zone. The first detection zone may be considered an entering zone, where a user makes an approach (e.g., an initial approach) toward the hybrid sensor 200. The second detection zone may be considered a using zone, where the user may be standing proximate to the hybrid sensor 200 (e.g., evacuating their bladder over a toilet, standing at a sink to wash their hands, standing at hand dryer and/or paper towel dispenser, etc.). The third detection zone may be a sitting zone, where the user may be sitting proximate to the hybrid sensor 200. It will be appreciated that the example above is merely illustrative and more, or fewer, detection zones may be employed by the hybrid sensor 200.

Figure 3:
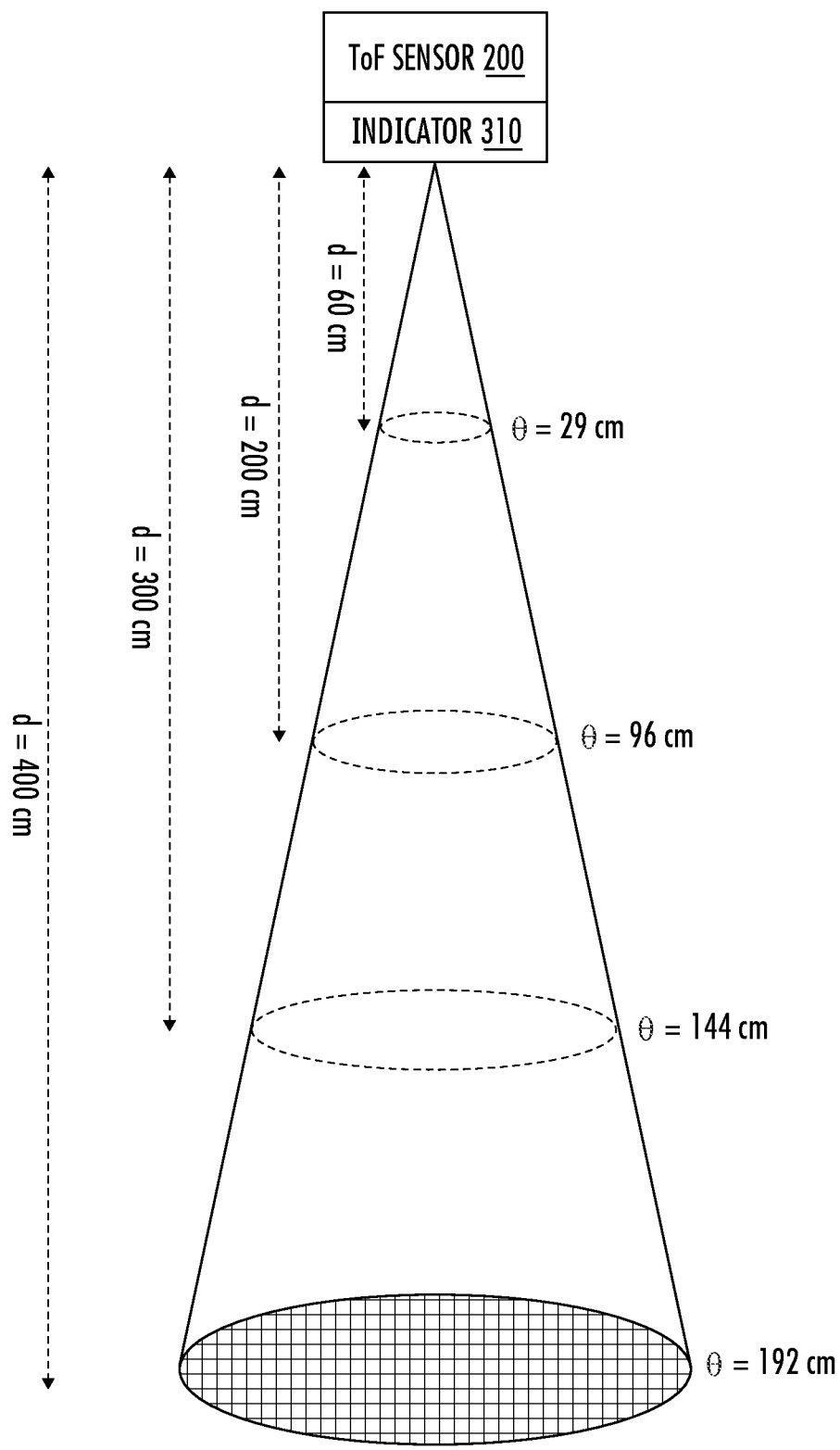
FIG. 3 shows an example of a field of view of the time-of-flight sensor according to one or more aspects of the disclosure.

The hybrid sensor 200 may project a grid that is used to detect additional information about an occupant, such as which direction the occupant is travelling (e.g., entering vs. exiting). FIG. 3 shows an example of a field-of-view for a time-of-flight sensor. The time-of-flight sensor may be the sensor 200, shown in FIG. 2. As noted above, the sensor may comprise an indicator 310. The indicator 310 may comprise one or more lights (e.g., LEDs). The indicator 310 may provide an indication of when a fixture is in use. For example, the indicator 310 may produce a green light when a fixture (e.g., water closet) is not in use. When the fixture is in use, the indicator 310 may produce a red light. Similarly, the indicator 310 may produce a red light, for example, when a fixture is out-of-service. In some examples, the indicator 310 may produce an orange or yellow light, for example, when a fixture needs service and/or maintenance.

In operation the sensor 200 may produce one or more beams of light. The one or more beams of light may form a coverage area comprising a plurality of pixels. As shown in FIG. 3, beams of light may form a cone of coverage. Accordingly, the coverage area may expand the further away the beams of light travel from the sensor 200. In FIG. 3, the coverage area 60 cm from the sensor 200 has a diameter of 29 cm. The farther the light travels, the more expansive the coverage: at 200 cm from the sensor 200 the diameter of the coverage area is 96 cm; at 300 cm from the sensor 200 the diameter of the coverage area is 144 cm; and at 400 cm the diameter of the coverage area is 192 cm. It will be appreciated that these coverage areas are merely illustrative, and the sensor may be adjusted to provide different coverage areas, depending on the application. As noted above, the sensor 200 may be configured to detect an object (e.g., person), as well as the direction (e.g., entering, exiting) of the object. The object may be detected, for example, based on changes in the reflected light associated with each of the plurality of pixels.

Figure 4:
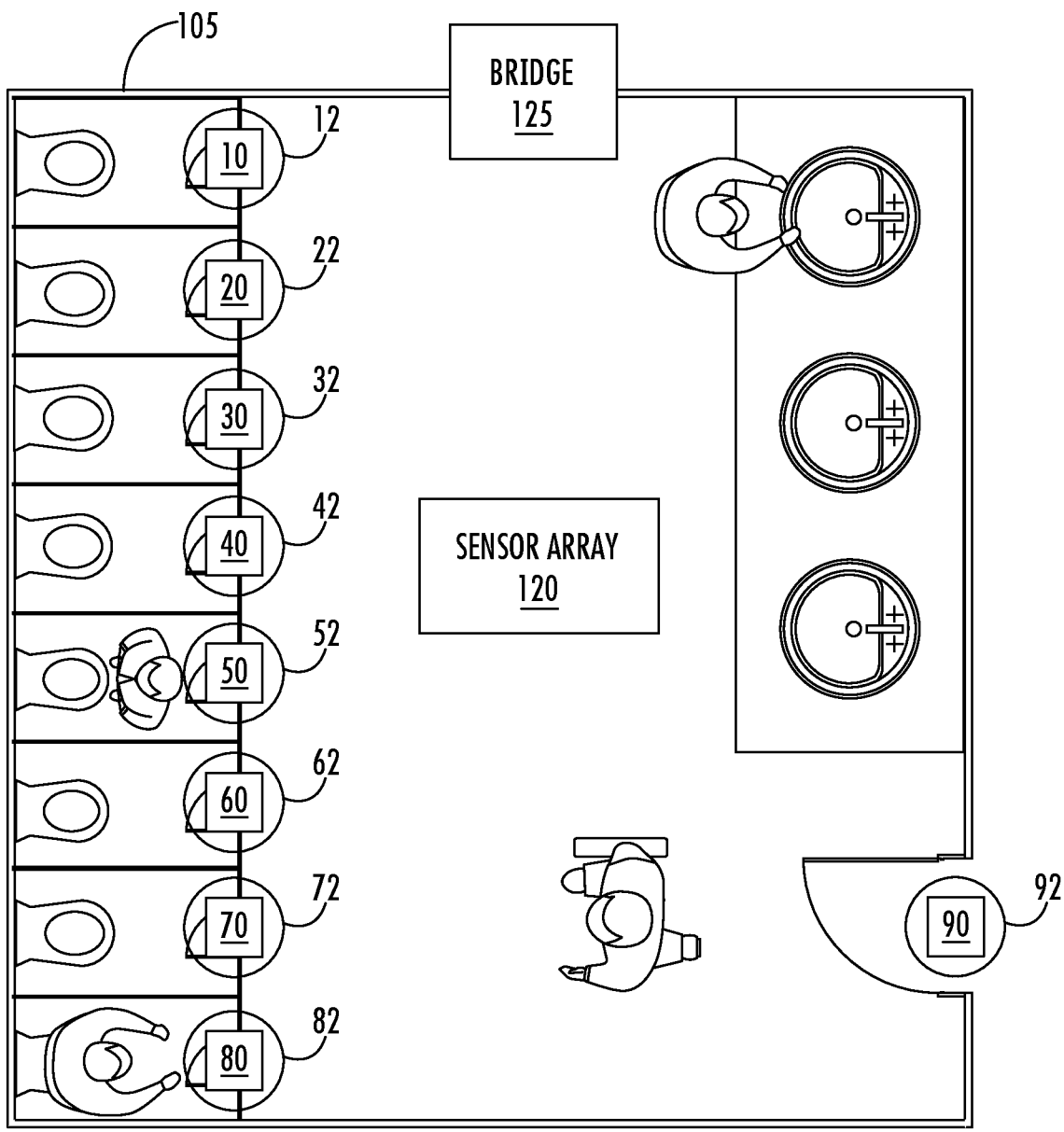
FIG. 4 shows an example of a sensor array determining bathroom occupancy in accordance with one or more aspects of the disclosure.

FIG. 4 shows an example of a sensor array determining bathroom occupancy. The sensor array 120 and/or the plurality of sensors (e.g., 10, 20, 30, 40, 50, 60, 70, 80, 90) may work in conjunction to determine the bathroom occupancy. In this regard, the sensor array 120 and/or the plurality of sensors (e.g., 10, 20, 30, 40, 50, 60, 70, 80, 90) may detect one or more users in the restroom 105. Additionally, the sensor array 120 and/or the plurality of sensors (e.g., 10, 20, 30, 40, 50, 60, 70, 80, 90) may track the movement of users from one fixture to another. That is, the sensor array 120 may communicate with the plurality of sensors (e.g., 10, 20, 30, 40, 50, 60, 70, 80, 90) as the users enter bounded areas of the sensor array field of view. As noted above, the sensor array 120 may also comprise multiple sensor arrays. In this regard, the multiple sensor arrays, as well as the plurality of sensors (e.g., 10, 20, 30, 40, 50, 60, 70, 80, 90), may integrate movement and/or tracking from one array to another so as to realize a homogenous sensing area. As shown in FIG. 4, the sensor array 120 may detect a first person at the sink and a second user entering the restroom 105. Additionally, the sensor 90 may detect the second user entering the restroom 105 and communicate the information to the sensor array 120. The sensor 90 and the sensor array 120 may coordinate to track the movement of the second user. Similarly, the sensor 50 and the sensor 80 may detect a third user and a fourth user, respectively, entering different water closets. In this regard, the information gathered from the sensor array 120, the sensor 90, the sensor 50, and the sensor 80 may be combined to determine an estimate of the restroom 105's occupancy. As noted above, the information from the sensors shown in FIG. 4 may be aggregated to arrive at the estimate of the bathroom's occupancy. The local computing device 129 and/or the server 130 may aggregate the information and/or calculate the bathroom's occupancy, for example, using predictive modeling, queuing theory, one or more machine learning models, multi-object tracking, pose estimation, or any combination thereof. In this regard, the resolution from multiple time-of-flight sensors, as well as the sensor array, may provide sufficient detail to identify individual users. Additionally or alternatively, information from the plurality of sensors may be aggregated using, for example, sensor fusion and/or ensemble methods. That is, images and/or information from the plurality of sensors may be combined or stitched together, for example, using feature matching and/or homography. By aggregating information from a plurality of different sensors, the restroom occupancy may be more robust to changes in ambient conditions, as well as sensor failures. In further examples, the sensors may transmit the information to a server, such as server 130, which may provide an estimate of the restroom 105's occupancy. Additionally, the server (e.g., server 130) may provide real-time information about the occupancy of the restroom 105 via the dashboard 135 (e.g., portal).

Figure 5A:
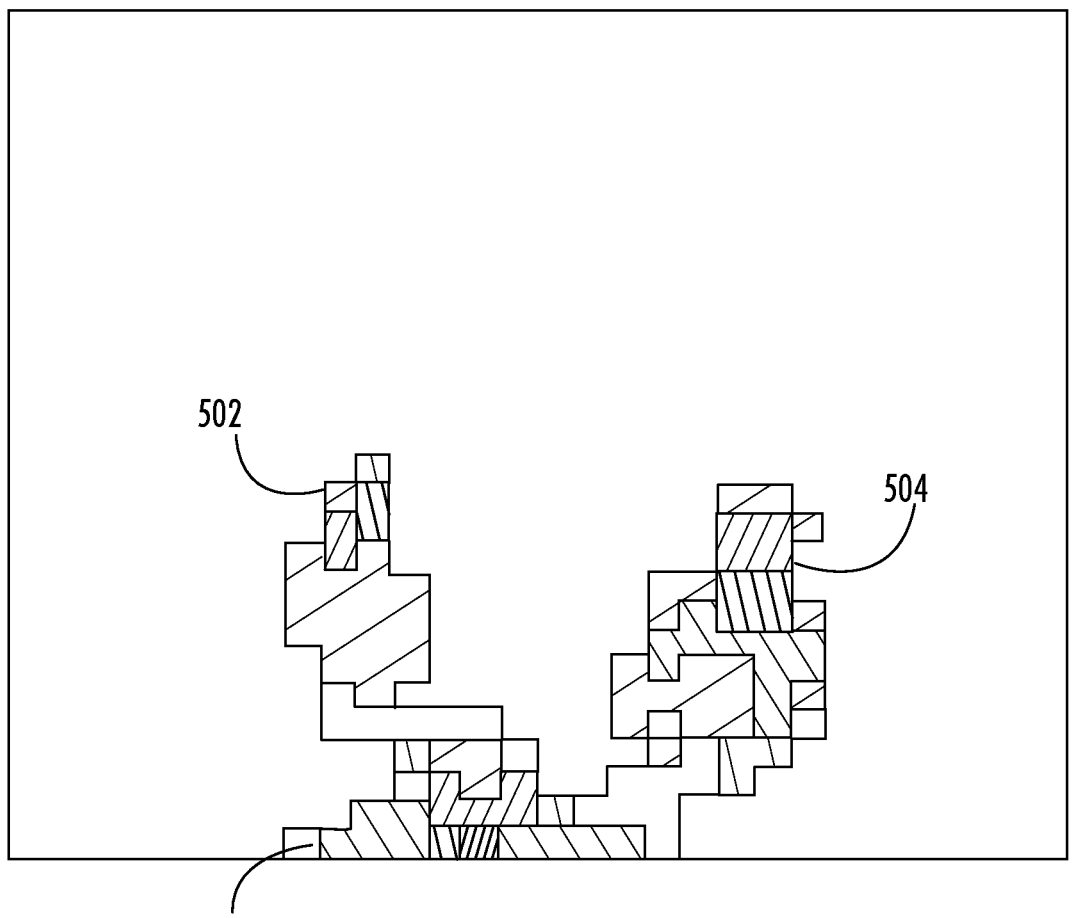
FIG. 5A shows an example of an image captured by a sensor array that is used to determine bathroom occupancy according to one or more aspects of the disclosure.
Figure 5B:
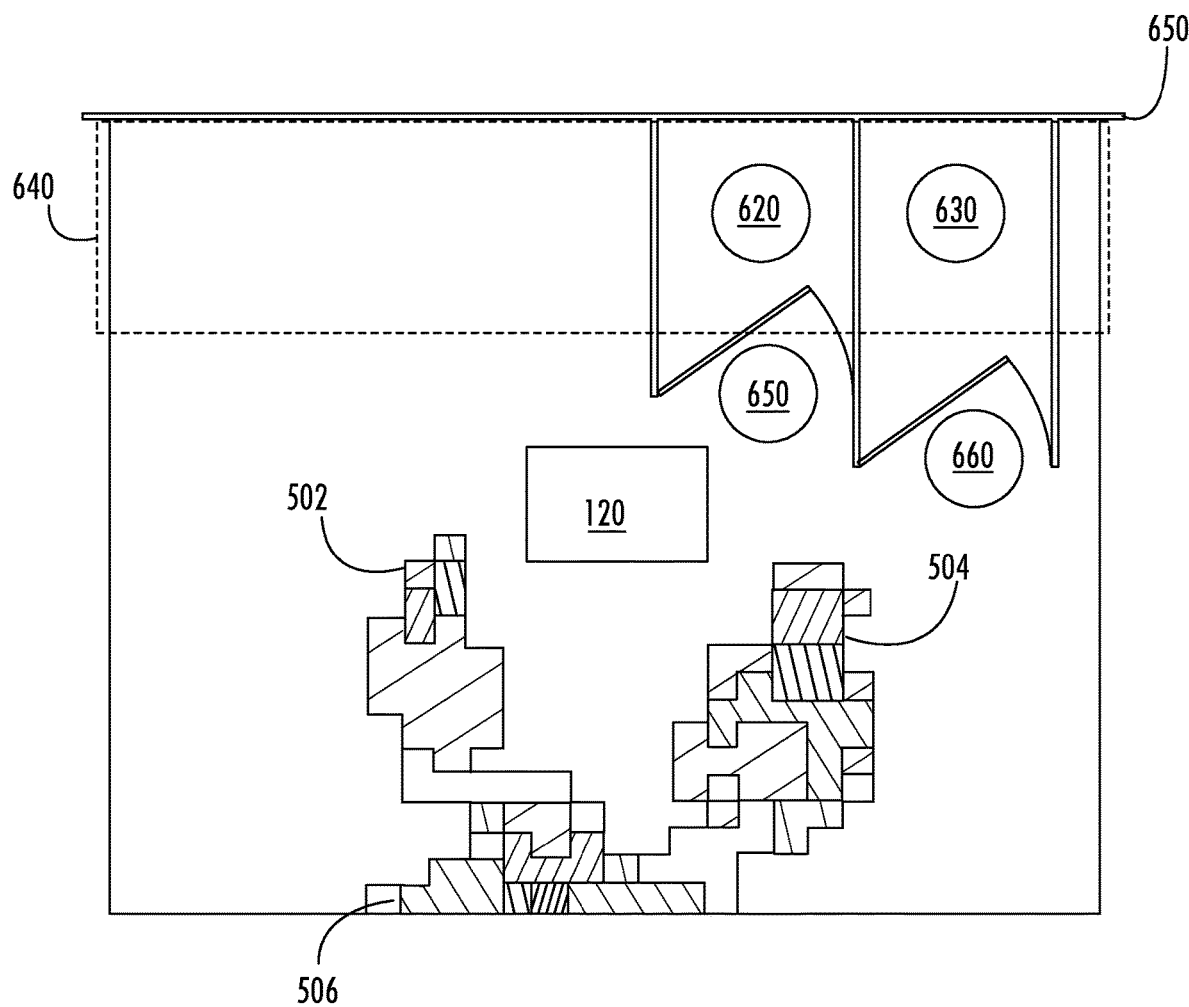
FIG. 5B shows another example of another image captured by a sensor array that is used to determine bathroom occupancy according to one or more aspects of the disclosure.

FIGS. 5A and 5B shows an example of a thermal image captured by the sensor array 120. The thermal image may be used to track one or more restroom occupants as they go about their business in the restroom. As shown in FIG. 5A, the sensor array 120 may detect a first person 502, a second person 504, and a third person 506. In this regard, the sensor array 120 may be trained to recognize human heat signatures in the thermal images. The sensor array 120, or a computing device associated with sensor array 120, may comprise one or more machine learning models configured to analyze the thermal images for image feature descriptors and/or detectors. The one or more machine learning models may also be configured to determine a user's intent based on their location in the restroom, relevant pose estimation, multi-object tracking, an amount of time spent in the location, etc. The one or more machine learning models may comprise a neural network, such as a convolutional neural network (CNN), a recurrent neural network, a recursive neural network, a long short-term memory (LSTM), a gated recurrent unit (GRU), a pre-trained network, a transformer (e.g., a deep learning model), or any equivalent thereof. Additionally or alternatively, the machine learning model may comprise one or more decisions trees, support vector machines, Gaussian mixture models, k-means clustering, etc. The one or more machine learning models may be trained to recognize human heat signatures. Additionally or alternatively, the one or more machine learning models may be trained to ignore stationary heat sources, such as hand dryers and bathroom lighting. The one or more machine learning models may also adapt to varying ambient conditions, for example, via adaptive background subtraction and/or kernel density estimation. The one or more machine learning models may be trained using supervised learning, unsupervised learning, reinforcement learning, semi-supervised learning, back propagation, transfer learning, stochastic gradient descent, learning rate decay, dropout, max pooling, batch normalization, or any equivalent deep learning technique.

FIG. 5B shows an example of another thermal image captured by sensor array 120. As noted above, the thermal image shown in FIG. 5B may be an overhead (e.g., top-down) image taken from a ceiling of a restroom. FIG. 5B shows the sensor array 120 configured to recognize a plurality of locations. The locations may be configured by a user, such as an installer, a technician, and/or an administrator. That is, the layout of a restroom may be programmed relative to a floor plan of the room. For example, the user may identify rear plumbing wall 610, first location 620 and/or second location 630. The user may also associate sensors with various locations. In the example shown in FIG. 5B, first location 620 may be associated with a first water closet and second location 630 may be associated with a second water closet. The user may also associate first sensor 650 with the first water closet and second sensor 660 with the second water closet. First sensor 650 and/or second sensor 660 may be similar to the sensors discussed above with respect to FIG. 3 and include one or more indicators indicating an occupancy status of the associated water closet. As discussed herein, the first sensor 650, the second sensor 660, and/or sensor array 120 may coordinate to determine restroom occupancy, including the number of stalls currently being used and/or the number of stall currently available. Accordingly, the user may associate the first sensor 650 with the first location 620 and, similarly, the second sensor 660 with the second location 630 to assist in determining the restroom's occupancy.

Additionally, the sensor array 120 may be configured to automatically identify locations, such as a rear plumbing wall, plumbing fixtures, rough-ins, etc. As shown in FIG. 5B, sensor array 120 may activate one or more sensors. Based on the images generated by the one or more sensors, sensor array 120, or a computing device associated with sensor array 120, may identify one or more locations, including rear plumbing wall 610, first location 620, and/or second location 630. First location 620 and/or second location 630 may include one or more water closets, one or more urinals, one or more sinks, one or more hand drying stations, etc. Additionally or alternatively, first location 620 and/or second location 630 may be a standard fixture rough-in that is typically installed in a rear plumbing wall, such as rear plumbing wall 610, that includes utilities, such as supply water, waste drains, and/or electrical. Given the fairly consistent distance between general plumbing rough-ins, bathroom enclosures—whether the enclosures be standard or ADA-compliant, and/or flushing apparatuses, sensor array 120 may be configured to determine additional locations within its view. That is, sensor array 120 may be able to determine additional locations of bathroom fixtures based on identifying a first location. The additional locations may be determined, in part, using standard fixture rough-ins and/or laws defining the distance between fixtures.

Additionally or alternatively, the sensor array 120 may be configured to identify one or more items in sensor array 120's field of view, for example, using imaging software that maps the room. Sensor array 120 may use one or more image capture devices, or other sensors, to determine the dimensions, equipment, fixtures, and other items located in a restroom. In some examples, sensor array 120 may coordinate with a robotic unit, similar to those found in automated home vacuuming units—like Roombas, to trace out the size and/or layout of the restroom. Before the sensor array 120 or any other sensors are installed, the robotic unit (e.g., a floor moving robot) may trace out (e.g., map) the overall size and/or dimensions of the restroom, locate floor to ceiling partitions relative to an initial starting point (e.g., an entrance of the restroom), and/or other features unique to the restroom. To trace out the size and/or dimensions of the restroom, the robotic unit may perform an automated scan of the restroom to determine the floorplan, floor-to-ceiling enclosures, locations of the floor-to-ceiling enclosures, and/or the relative location of floor-to-ceiling enclosures from the entrance. In some embodiments, the robotic unit may determine an optimal location for sensor array 120 and/or any additional sensors. After completing a scan of the room, a map of the room, obtained by the robotic unit, may be downloaded to a computing device. The computing device may be label (name) various locations in the restroom. Additionally, the computing device may be configured to add additional locations to the mapping obtained by the robotic unit. When the sensor array 120 and/or any other sensors are installed, the mapping of the restroom may be overlain. This would provide the array sensor 120, and any other sensors, an initial understanding of the room. The overlain map may be used with the other techniques described herein to identify locations, fixtures, features, and/or elements of the restroom to generate a more accurate mapping of the restroom.

Floorplans of a target restroom may also be determined using one or more mapping techniques. For example, Light Detection and Ranging (LIDAR)-based techniques (e.g., LIDAR-based indoor mapping) may be used to determine a floorplan of the restroom. Additionally or alternatively, radio-frequency (RF)-based techniques may be used to determine the floorplan of the restroom. These techniques may be used in connection with the robotic unit. Alternatively, the techniques described above may used on their own, for example, in conjunction with the sensor array.

In yet another example, different locations may be tagged with identifying information. The tags may be tokens and/or beacons, such as Bluetooth Low Energy (BLE) beacons. The tokens may be a processor capable of being powered over-the-air to provide information to the sensor array 120. Additionally or alternatively, the tags may be computer-readable codes that provide information about the location and/or the fixture associated with the location. The computer-readable codes may comprise a bar code, a QR code, a machine-readable code that is not capable of being discerned by the human eye (e.g., an infrared code). Sensor array 120 may identify one or more tokens or beacons while scanning the restroom. Information may be read from the one or more tokens or beacons to enable the sensor array 120, or a computing device associated with sensor array 120, to create a mapping of the restroom. In some embodiments, artificial intelligence, such as one or more machine learning models, may rely on standard plumbing rough ins to determine the mapping of the restroom. For example, the artificial intelligence may determine that water closets are a first predetermined distance apart, including partitions, while urinals may be a second predetermined distance apart. Similarly, the artificial intelligence may recognize that electronic faucets may be clustered in a predetermined area. With the sensors scanning the room and/or the electronic devices annunciating where they are located relative to the one or more sensors, an accurate mapping of the restroom may be generated. Additionally, the one or more sensors may communicate with each other to determine the distance between each sensor to generate a more detailed map of the restroom.

Based on the mapping of the room, sensor array 120 may be configured to identify one or more detection zones, such as detection zone 640. Detection zone 640 may be used, in combination with one or more deterministic models, to determine usage of the restroom, as well as availability of individual units. As noted above with respect to FIG. 2, the detection zone 640 may be used to detect a user's location in a restroom. Additionally or alternatively, detection zone 640, or the use of multiple detection zones, may be used to discern a user's intent and/or activity. For example, sensor array 120 may determine that a user who enters a water closet and remains in detection zone 640 may be urinating. Conversely, sensor array 120 may determine that a user who enters a water closet and remains over first location 620 (e.g., a second detection zone (not shown)) may be evacuating their bowels. Additionally or alternatively, sensor array 120 may determine whether the user is utilizing the water closet or simply occupying the enclosure for other personal use (e.g., changing clothes). In some embodiments, sensor array 120, first sensor 650, second sensor 660, or any combination thereof may detect the activation of a device (e.g., a toilet, or urinal, flushed, a sink turned on/off, a hand dryer activated, a paper towel dispenser activated, etc.). By using the sensor array 120 and/or additional sensors, the system may be able to distinguish between different activities, without using intrusive and/or obtrusive imaging cameras.

By creating and/or establishing detection zone 640, sensor array 120 may control other devices in the restroom. Returning to the example of a user entering a water closet, sensor array 120 may cause a first sensor 650 to change color to show that the water closet is occupied, for example, in response to detecting the user in the detection zone 640. Similarly, sensor array 120 may cause a second sensor 660 to show that a second water closet is unoccupied and available for use. First sensor 650 and/or second sensor 660 may be similar to the indicators discussed above with respect to FIG. 3. For example, first sensor 650 and/or second sensor 660 may be located in the ceiling proximate to the entrance to a water closet (e.g., above a stall door). First sensor 650 and/or second sensor 660 may be communicatively coupled to sensor array 120. While only two sensors are described herein, it will be appreciated that the number of sensors used may be increased, with a one-to-one relationship depending on the number of units (e.g., water closets, urinals, sinks, etc.) in the restroom. First sensor 650 and/or second sensor 660 may provide a signal to sensor array 120 indicating a user entering and/or leaving a stall. Similarly, the first sensor 650 and/or second sensor 660 may provide an indication that a user remains in a stall and/or that a stall door remains closed. This may assist sensor array 120 in determining an occupancy map for the restroom. Additionally or alternatively, this information may allow sensor array 120 and/or a computing device to determine an occupancy state of the restroom, which may cause a proper status to be displayed outside of the restroom.

The use of detection zone 640 may not be limited to activating, or deactivating, a sensor indicating whether a water closet is in use or not. Rather, detection zone 640 may also be used to detect when a user is leaving the detection zone. Sensor array 120 may be configured to activate a flush valve, or flushometer, to actuate a flushing action. Additionally or alternatively, sensor array 120 may activate a sink, for example, based on detecting a user in proximity to a sink. In yet another example, sensor array 120 may activate a hand dryer or paper towel dispenser in response to detecting a user in proximity to either of those units. In further examples, sensor array 120 may cause an automatic door to open, for example, in response to detecting a user approaching the door to exit the restroom.

Detection zone 640 and/or sensor array 120 may use predictive modeling of queuing theory to determine an expected occupancy exit. Additionally, detection zone 640 may be defined by a detection range of an active infrared sensor, such an infrared sensor of the first sensor 650. That is, the detection range of sensor array 120 may be expanded, for example, using an active infrared sensor of first sensor 650 and/or second sensor 660. It will be appreciated that the examples described above are non-limiting and additional detection zones can be used to expand into other restroom spaces, for example, to control lighting, venting, and/or odor control. Moreover, certain functionality, such as spraying air freshener, may be based on occupant mapping or a determination that the restroom is unoccupied.

By using sensor array 120, first sensor 650, and/or second sensor 660 to determine restroom occupancy, the need for mechanical translation of an enclosure occupancy system, such as a door lock mechanism, is eliminated. Moreover, hardwiring the sensors reduces maintenance costs by eliminating the need to replace batteries in remote sensing equipment of multiple door lock mechanisms and upkeep sensors from continual mechanical latching and unlatching. Furthermore, by locating the occupancy sensors in the ceiling, above the monitored enclosure, reduces the likelihood of tampering and provides easier access to power and/or communication lines, which may be run through the ceiling. Finally, by placing the occupancy sensors in the ceiling, accurate occupancy estimates may be determined without the need for the precise optical transmission between a door latching mechanism and a ceiling-mounted sensor.

Figure 6:
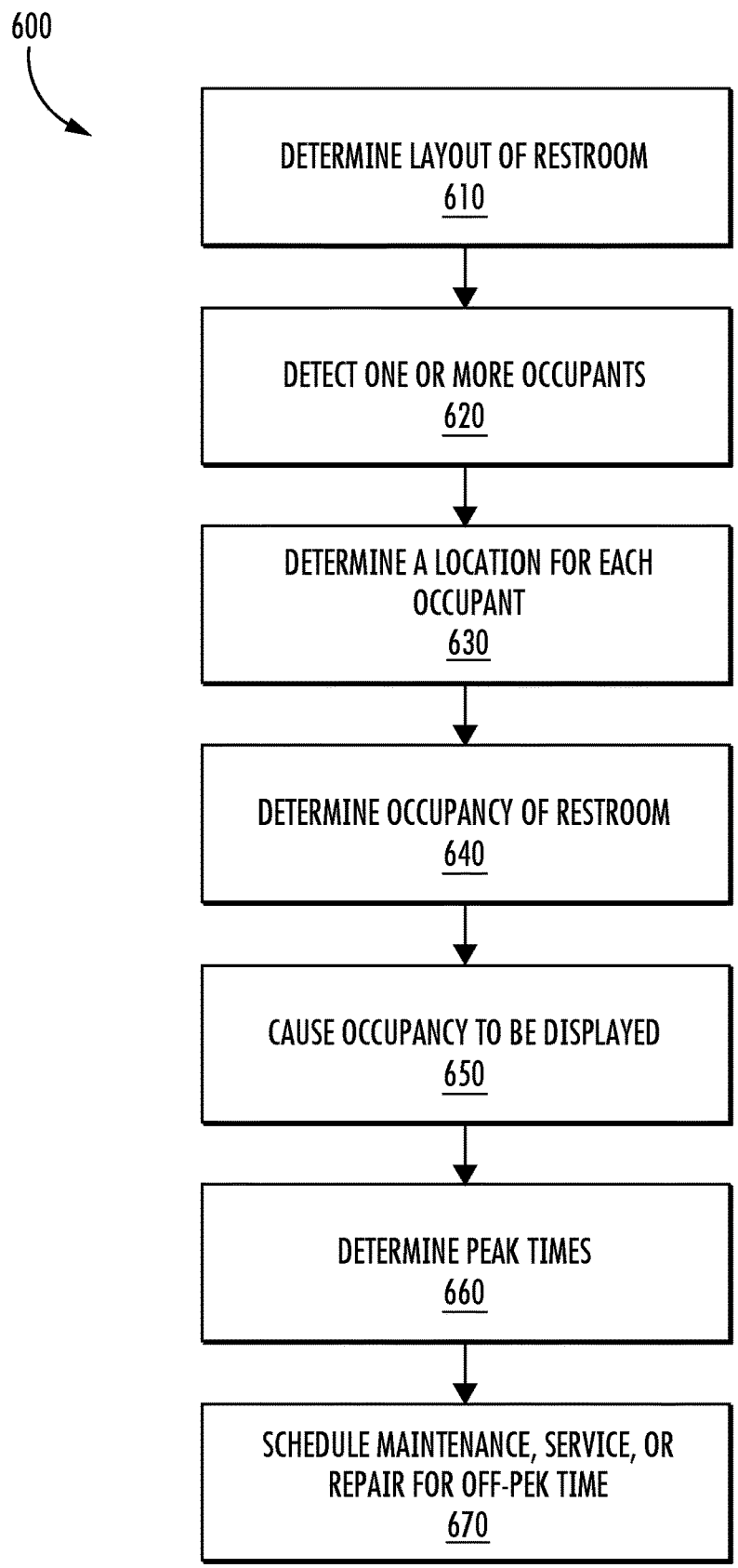
FIG. 6 shows an example process for determining bathroom occupancy in accordance with one or more aspects of the disclosure.

FIG. 6 shows an example of a process 600 for determining restroom occupancy in accordance with one or more aspects of the disclosure. Some or all of the steps of process 600 may be performed using one or more devices as described herein, including, for example, the devices discussed above with respect to the restroom occupancy system discussed in FIGS. 1A and 1B.

In step 610, a restroom occupancy system may determine a layout of a restroom. The restroom occupancy system may determine the layout of the restroom using a sensor array and/or a plurality of sensors. That is, the sensor array and/or the plurality of sensors may capture several images of the restroom. Image analysis techniques may be applied to the images to determine a shape of the restroom, a size of the restroom, dimensions of the restroom, etc. Additionally, the image analysis may identify fixtures and/or features of the restroom, such as toilets, urinals, water closets, bidets, sinks, hand drying stations, etc. The image analysis techniques may also identify how many of each fixture and/or feature are located in the restroom. For example, the image analysis technique may determine how many sinks, how many toilets, and how many urinals are in a restroom. Additionally or alternatively, other techniques may be used to determine the layout of the restroom. As discussed above in references to FIG. 5B, a robotic unit, similar to a Roomba, may be used to map a floorplan of the restroom. The robotic unit may also scan of restroom to determine the floorplan, floor-to-ceiling enclosures, locations of the floor-to-ceiling enclosures, and/or the relative location of floor-to-ceiling enclosures. In further embodiments, information gathered by the restroom occupancy system and/or the robotic unit may be provided to a user device. The user device may input the location of various fixtures and/or features of the restroom. That is, the restroom occupancy system may receive a location for each of a plurality of plumbing fixtures located in the restroom from a user device. It will be appreciated that one or more of the techniques described herein may be used, individually or in combination, to determine the layout of the restroom.

In step 620, the restroom occupancy system may detect one or more occupants in the restroom. One or more occupants may be detected entering, or exiting, the restroom, for example, using a sensor located over the entryway and/or exit. Additionally, one or more occupants may be detected using the sensor array. That is, the sensor array may obtain one or more images of the restroom. The one or more images may be analyzed, using image analysis techniques and/or machine learning models, to identify one or more people in the restroom. As noted above, the one or more images may comprise thermal images. The sensor array may recognize heat signatures associated with one or more people in the restroom. Additionally or alternatively, sensors proximately located next to plumbing fixtures and/or features may detect one or more occupants. The sensor array and/or the plurality of sensors may work in unison to track occupants as they enter and leave the restroom. Additionally, the sensor array and/or the plurality of sensors may coordinate to track occupants as they move about the restroom. These tracking techniques may be used to determine a location of each occupant and, ultimately, the occupancy of the restroom.

In step 630, the restroom occupancy system may determine a location for each of the one or more occupants. The location of each of the occupants may be determined using the sensor array and/or the plurality of sensors. Additionally, the location of each occupant may be based on an occupant's relative location relative to various fixtures and/or features identified in the layout of the restroom. That is, the restroom occupancy system may determine whether one or more plumbing fixtures are currently being used based on the location for each of the one or more occupants. As noted above, the restroom occupancy system may cause an indicator (e.g., light) above the fixture to change to indicate that the fixture is being used. Similarly, the restroom occupancy system may cause the indicator (e.g., light) above the fixture to change to indicate that the fixture is available for use.

After determine the location of each occupant, the restroom occupancy system may determine an occupancy of the restroom, in step 640. The occupancy may be determined using predictive modeling. For example, the number of occupants in the vestibule of the restroom and/or the number of fixtures being used may be inputted into a predictive model to determine the occupancy of the restroom. In step 650, the restroom occupancy system may cause an indication of the occupancy to be displayed. The occupancy may be displayed on a display device outside of the restroom as shown, for example, in FIG. 1A. Additionally or alternatively, the occupancy may be displayed via a dashboard that is accessible by one or more user devices as shown, for example, in FIG. 1B. displaying the indication of the occupancy on a display device located outside of the restroom.

In step 660, the restroom occupancy system may determine an occupancy of the restroom throughout a predetermined period of time, such as throughout a business day. For example, the occupancy of a restroom may be tracked throughout the day in real-time, or near real-time. Alternatively, the occupancy of a restroom may be determined at predetermined intervals, such as every five minutes, half hour, hour, etc. In some embodiments, the occupancy of a restroom may be determined at predetermined intervals throughout the day, but scaled back at night and/or at weekends. Determining the occupancy periodically may allow the restroom occupancy system to determine peak usage times, average usage length, hygiene practices of average users, etc., in step 660. Based on the determining peak usage times of the restroom, the restroom occupancy system may schedule maintenance, service, and/or repairs, for example, during an off-peak time.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although certain specific aspects of various example embodiments have been described, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. Thus, embodiments disclosed should be considered in all respects as examples and not restrictive. Accordingly, the scope of the inventions herein should be determined not by the embodiments illustrated, but by the appended claims and their equivalents.

The invention claimed is:

1. A method comprising:
identifying, by one or more thermal sensor arrays of a restroom occupancy system and using a short-range wireless protocol, a plurality of sensors, wherein each of the plurality of sensors is associated with a plumbing fixture and at least one of the plurality of sensors comprises a time-of-flight sensor, associated with a first plumbing fixture, configured to detect an object and a direction of travel of the object by projecting one or more beams of light to form a coverage area;
determining, using the one or more thermal sensor arrays and the plurality of sensors, a layout of a restroom;
determining, using the one or more thermal sensor arrays, one or more occupants in the restroom;
determining, using the one or more thermal sensor arrays and the plurality of sensors, a location for each of the one or more occupants based on the layout of the restroom;
determining, based on the location for each of the one or more occupants, whether one or more plumbing fixtures, a plurality of plumbing fixtures, are currently being used;
determining, based on data from the time-of-flight sensor and based on data from the one or more thermal sensor arrays, a first occupant's intent at the first plumbing fixture;
tracking, using the one or more thermal sensor arrays, the first occupant from the first plumbing fixture through the restroom;
activating, based on a determination of the first occupant's intent at the first plumbing fixture and based on tracking the first occupant from the first plumbing fixture through the restroom, a second plumbing fixture;
determining, based on detecting the one or more occupants, based on a determination that a predetermined number of the plurality of plumbing fixtures are being used, and based on one or more actions of the first occupant, an occupancy of the restroom; and
causing, by the restroom occupancy system, an indication of the occupancy to be displayed.

2. The method of claim 1, wherein determining the layout of the restroom comprises:
generating the layout of the restroom using a robotic unit configured to map a floorplan of the restroom.

3. The method of claim 1, wherein determining the layout of the restroom comprises:
identifying, using the one or more sensor arrays and the plurality of sensors, a location for each of the plurality of plumbing fixtures.

4. The method of claim 1, wherein determining the layout of the restroom comprises:
receiving a location for each of the plurality of plumbing fixtures from a user device.

5. The method of claim 1, further comprising:
based on a determination that the first plumbing fixture is currently being used, causing an indication that the first plumbing fixture is being used to be displayed.

6. The method of claim 5, further comprising:
based on a determination that the first plumbing fixture is no longer being used, causing a second indication that the first plumbing fixture is available to be displayed.

7. The method of claim 1, wherein determining the occupancy of the restroom is based on predictive modeling.

8. The method of claim 1, wherein causing the indication of the occupancy to be displayed further comprises displaying the indication of the occupancy on a display device located outside of the restroom.

9. The method of claim 1, wherein causing the indication of the occupancy to be displayed further comprises displaying the indication of the occupancy via a dashboard accessible by one or more user devices.

10. The method of claim 1, further comprising:
determining, by the restroom occupancy system, an occupancy of the restroom throughout a predetermined period of time;
determining, using the occupancy of the restroom throughout the predetermined period of time, an average peak usage time for the restroom; and
scheduling maintenance, service, or repairs for the restroom during an off-peak time.

11. A restroom occupancy system comprising:
one or more processors;
one or more thermal sensor arrays centrally-located within a restroom;
a plurality of sensors, wherein:
    each of the plurality of sensors is associated with a plumbing fixture of a plurality of plumbing fixtures; and
    at least a portion of the plurality of sensors comprises time-of-flight sensors, wherein a first time-of-flight sensor, associated with a first plumbing fixture, is configured to detect an object and a direction of travel of the object by projecting one or more beams of light to form a coverage area; and
memory storing instructions that, when executed by the one or more processors, cause the restroom occupancy system to:
    identify, by the one or more thermal sensor arrays and using a short-range wireless protocol, the plurality of sensors;
    determine, using the one or more sensor arrays and the plurality of sensors, a layout of a restroom;
    detect one or more occupants in the restroom;
    determine, using at least one of the one or more thermal sensor arrays and the plurality of sensors, a location for each of the one or more occupants based on the layout of the restroom;
    determine, based on the location for each of the one or more occupants, whether one or more plumbing fixtures are currently being used;
    determine, based on data from the first time-of-flight sensor and based on data from the one or more thermal sensors, a first occupant's intent at the first plumbing fixture;
    track, using the one or more thermal sensors, the first occupant from the first plumbing fixture through the restroom;
    activate, based on a determination of the first occupant's intent at the first plumbing fixture and based on tracking the first occupant from the first plumbing fixture through the restroom, a second plumbing fixture;
    determine, based on detecting the one or more occupants, based on a determination that a predetermined number of the plurality of plumbing fixtures are being used, and based on one or more actions of the first occupant, an occupancy of the restroom; and
    cause an indication of the occupancy to be displayed.

12. The restroom occupancy system of claim 11, further comprising:
a display configured to display the indication of the occupancy.

13. The restroom occupancy system of claim 11, further comprising:
a dashboard, accessible by one or more user devices, configured to display the indication of the occupancy.

14. The restroom occupancy system of claim 11, wherein a first time-of-flight sensor comprises an indicator to show a status of a first plumbing fixture.

15. The restroom occupancy system of claim 14, wherein the status indicates whether the first plumbing fixture is currently in-use.

16. The restroom occupancy system of claim 11, wherein the instructions, when executed by the one or more processors, cause the restroom occupancy system to determine the occupancy of the restroom using predictive modeling.

17. The restroom occupancy system of claim 11, further comprising:
a robotic unit configured to map a floorplan of the restroom as part of a determination of the layout of the restroom.

18. The restroom occupancy system of claim 11, wherein the first time-of-flight sensor comprises at least one of:
a sensor located above an entryway to the restroom; or
a sensor located above a doorway to a water closet.

19. The restroom occupancy system of claim 11, wherein the plurality of plumbing fixtures comprises at least one of:
a toilet;
a urinal;
a faucet;
a paper towel dispenser;
a hand dryer;
a hand sanitation unit; or
a soap dispenser.

20. The restroom occupancy system of claim 11, wherein the instructions, when executed by the one or more processors, cause the restroom occupancy system to determine the location for each of the one or more occupants by:
detecting, using one or more machine learning models, heat signatures associated with each of the one or more occupants, wherein the one or more machine learning models are trained to ignore stationary heat sources.

21. The restroom occupancy system of claim 11, wherein the coverage area comprises a grid formed by the one or more beams of light.

* * * * *